No. 702,105. Patented June 10, 1902.
J. LEMIRE.
CURD CUTTER.
(Application filed Jan. 18, 1901.)
(No Model.) 2 Sheets—Sheet 1.
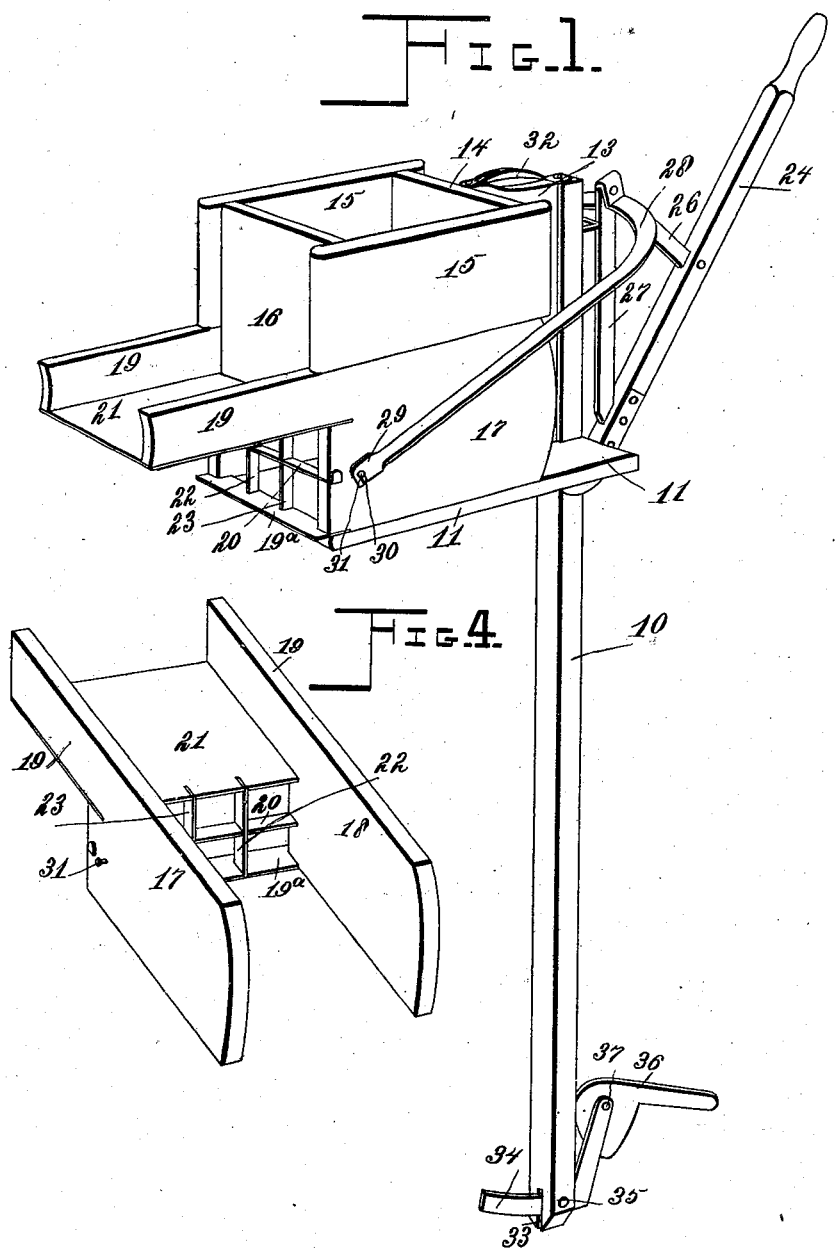
Witnesses:
J. H. Groat.
J. Ed. Page.
Joseph Lemire, Inventor
By Marion & Marion
Attorneys

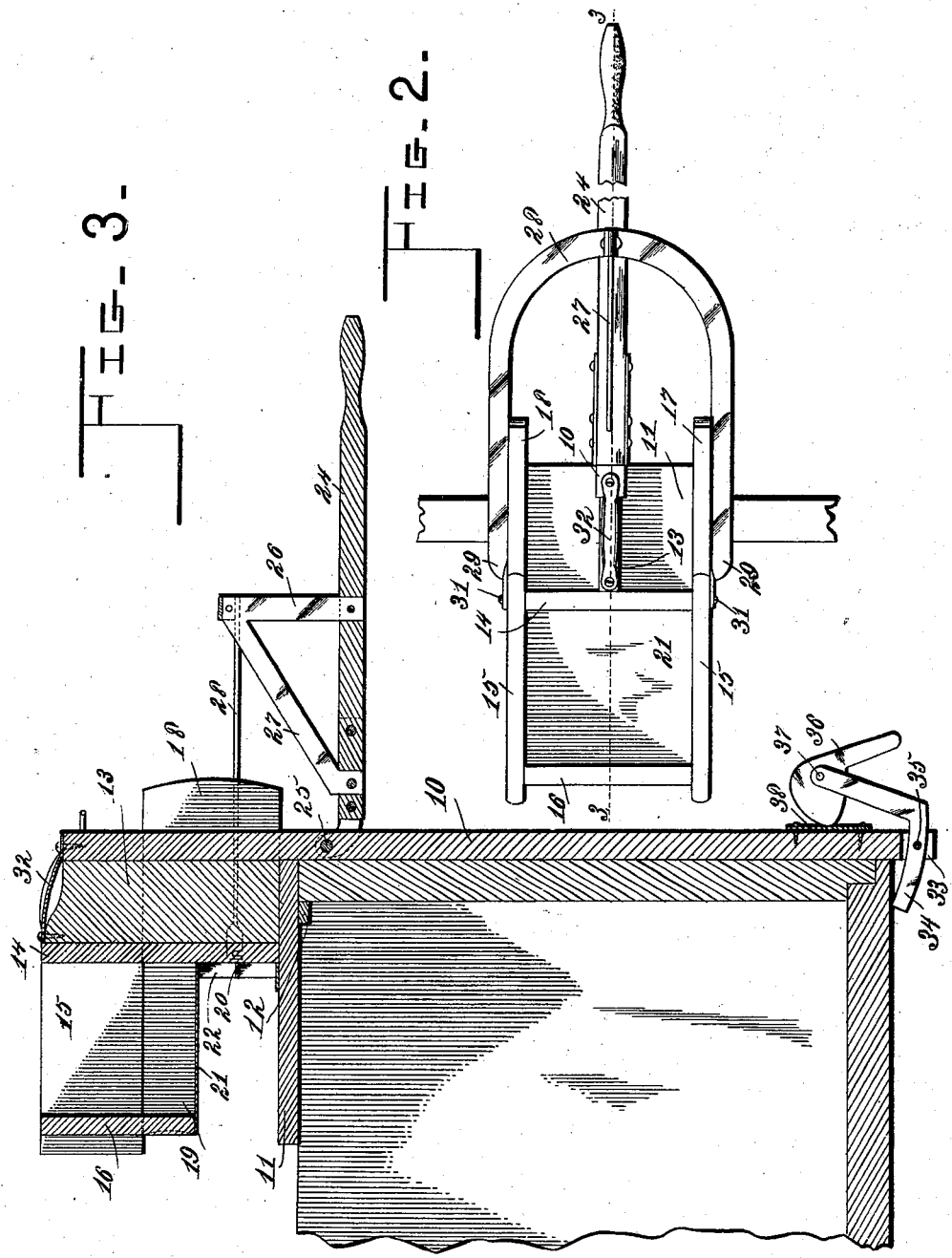

UNITED STATES PATENT OFFICE.

JOSEPH LEMIRE, OF DRUMMONDVILLE, CANADA, ASSIGNOR TO LOUIS ADELARD BRIEN, OF ST. GERMAIN DE GRANTHAM, QUEBEC, CANADA.

CURD-CUTTER.

SPECIFICATION forming part of Letters Patent No. 702,105, dated June 10, 1902.

Application filed January 18, 1901. Serial No. 43,709. (No model.)

*To all whom it may concern:*

Be it known that I, JOSEPH LEMIRE, a subject of Her Majesty the Queen of Great Britain, residing at Drummondville, county of Drummond, Province of Quebec, Canada, have invented certain new and useful Improvements in Curd-Cutters; and I do hereby declare that the following is a full, clear, and exact description of the invention, such as will enable others skilled in the art to which it appertains to make and use the same.

My invention relates to improvements in curd-cutters, and one object that I have in view is to provide a portable implement especially designed for use in cheese-factories and equipped with means whereby it may be clamped removably upon a vat or other vessel.

A further object of the invention is to equip the implement with a reciprocatory cutter-frame adapted to cut the mass of curd into a plurality of sections which are of corresponding cubical area, such movement of the cutter-frame being effected easily and quickly through the medium of a suitable lever.

Further objects and advantages of the invention will appear in the course of the subjoined description, and the novelty in the combination, construction, and arrangement of parts will be pointed out in the claims.

In the drawings hereto annexed, forming a part of this specification, Figure 1 is a perspective view of my improved curd-cutter. Fig. 2 is a plan view thereof. Fig. 3 is a vertical section in the plane of the dotted line 3 3 on Fig. 2. Fig. 4 is a perspective view of the cutter-frame detached from the hopper and the platform.

The same numerals of reference denote corresponding parts in each figure of the drawings.

The working parts of my implement are mounted on a post 10 and a platform 11, said platform being secured firmly to the post in any approved way and braced by the batten or strip 12. The other part of the post is enlarged or widened, as at 13, for the purpose of having the front wall 14 of a hopper 15 secured firmly thereto, said front wall extending from the platform 11 to the top edge of the enlargement 13 on the post. The side walls of the hopper are cut away, so as to leave wide spaces between their lower edges and the platform; but the rear wall of the hopper extends below the edges of the side walls, as indicated at 16, the purpose of which will hereinafter appear.

The reciprocatory cutter-frame consists of the side pieces 17 18, having the extensions 19 projecting rearwardly therefrom, and these side pieces are connected firmly together by the horizontal cutters 19ª 20 and by the valve-plate 21. The horizontal cutters are secured to the sides of the cutter-frame, at the rear edges thereof, said cutters lying in the same vertical plane, and these cutters are intersected by the vertical cutters 22 23, which extend from the bottom cutter 19ª to the valve-plate 21. The vertical cutters are spaced with relation one to the other and to the sides of the cutter-frame, so as to form squares between the parts, and the vertical cutters have interlocking connection with the horizontal cutters by forming notches in the meeting edges of the cutter-strips in a manner well understood by those skilled in the art. The valve-plate 21 is secured to the lower edges of the extensions 19 of the cutter-frame, and the front edge of this valve-plate constitutes a cutting edge, which lies in the vertical plane of the corresponding edges of the cutters.

As will be seen, the portion of the cutter-frame in rear of the cutters and below the valve-plate 21 is cut away, so that as the cutter-frame is drawn forwardly to cut the curd the space in rear of the cutters is freely accessible to the hand of an operator, enabling him to move the curd strips from off of the platform 11 in an obvious manner.

The sides of the cutter-frame rest upon the platform 11 and work in the spaces between said platform and the lower edges of the side walls of the hopper, while the extension 16 on the back wall of the hopper fits in the space between said sides of the cutter-frame and works over the valve-plate 21. The cutter-frame is thus guided by the platform and the several walls of the hopper, so as to be limited to a reciprocatory movement across the bottom of the hopper, and this movement may be conveniently imparted to said cutter-frame by the lever 24, the same being fulcrumed on the post 10, as at 25. This lever carries a post 26, having the brace 27, and to the post is pivoted a bail 28, the free ends of which are bent, as at 29, and provided with the notches 30. Headed pins 31 are secured to the sides of the cutter-frame, with which pins engage the notched angular ends of the connecting-bail, whereby said bail is pivoted to the cutter-frame, which bail serves as the means for connecting the lever and the cutter-frame operatively together.

A handle 32 is secured to the upper part of the implement for conveniently carrying the same by hand.

The lower extremity of the post 10 is provided with a slot 33, in which is received a clamping-lever 34, the same being of angular form and having one arm thereof pivoted to the post, as at 35. The upstanding arm of this angular clamping-lever has a cam-lever 36 fulcrumed thereon at 37, and said cam-lever is adapted to work against a wear-plate 38, which is fastened to one face of the post 10.

In using my improvement the platform 11 is placed upon the top edge of a vat or other receptacle, as indicated by dotted lines in Fig. 3, while the horizontal arm of the clamping-lever 34 fits beneath the bottom of the vat. The cam-lever 36 may now be manipulated so as to tighten the clamping-lever 34 against the vat, and thereby firmly secure the implement in position thereon. Owing to the fact that the arm of the lever 34 extends inwardly, and therefore contacts with the vat below the batten or strip 12, it will be readily understood that these two parts (the batten or strip 12 and the lever 34) operate in opposition to each other to support the curd-cutting mechanism in proper position over the vat without necessitating the use of any support for the rear end of the platform and without placing an undue strain upon the parts, the post being of a length to steady the device, its contact with the surface of the side of the vat being maintained by the batten and lever, so that the movements of the cutter-frame will not disturb the position of the post relative to the vat. By leaving the rear end free of support it will be obvious that no particular care need be taken in applying the device in position, and, furthermore, that no special form of vat need be used. In addition the construction is easily removable, and hence the operator may change the position of the device relative to the vat thereby permitting him to move around a large vat as may be desired. Furthermore, it will be readily seen that the extending of the lever 34 inward, so as to assume a position below the vat, together with the operating-cam of a configuration and location which will not readily be released by strain placed on the inner end of the lever, will prevent any tendency of a vertical movement of the device relative to the vat, said lever and platform operating in opposition to such vertical movement. This is of advantage in view of the fact that the handle 24 being a pivotally-mounted one and having a movement through the arc of a circle extending upward and downwardly tends to raise the device, which raising is prevented by the lever 34, as above pointed out.

Assuming that the hopper is charged with the curd and that the lever is in the raised position, it is only necessary for the operator to depress the lever to make the bail pull the cutter-frame in a forward direction, and this operation forces the cutters and the valve-plate through the curd toward the front wall 14 of the hopper. The described movement of the valve-plate cuts off the free passage of the curd from the hopper and at the same time the cutters travel through the curd to cut the same into blocks of similar size. With the cutter-frame in its forward position easy access may be obtained by the operator to the cut substance for removing the latter from beneath the valve-plate. During such forward adjustment of the cutter-frame the hopper extension 16 sweeps close to the upper face of the valve-plate, thus preventing escape of any curd. It is evident that the connecting-bail may be lifted free from engagement with the headed studs to disconnect the cutter-frame from the lever, whereby said cutter-frame may easily be removed from the implement for the purpose of cleansing the same.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

I claim—

1. In a curd-cutting device, in combination, an elongated vertically-extending post or standard; a platform fastened to the upper portion of said post, said platform having the batten or strip 12; a curd-cutting mechanism mounted to reciprocate horizontally above said platform, said platform forming the bottom for said mechanism, the operating means for said mechanism being pivotally connected to said post and having a movement upwardly from and returning to a substantially horizontal position; and clamping means mounted on the lower portion of said post, said means extending inward and operating in opposition to said batten or strip, to prevent lateral and vertical movement of the post, whereby the device may be removably clamped to the outer side of a vat, the rear end extending thereover and being unsupported.

2. A curd-cutter comprising a hopper; a slidable cutter-frame disposed below the hopper and provided with a valve-plate; a fixed platform below said cutter-frame, cutters carried by the cutter-frame and disposed below the valve-plate, the cutter-frame in rear of the cutters and below the valve-plate being cut away at the sides, whereby the space in rear of the cutters is freely accessible; and means for reciprocating said cutter-frame in a horizontal direction, substantially as described.

3. A curd-cutter comprising a post or standard; a hopper secured thereto; a platform secured to the post in spaced relation to the hopper and provided with a depending portion 16; a withdrawable cutter-frame slidably fitted between the platform and the hopper and provided with a valve-plate 21 arranged to travel close to the depending portion 16, said cutter-frame having open sides and an open rear end below said valve-plate; a lever fulcrumed on the post and having an arm; a bail having a permanent pivotal connection with the lever-arm and arranged to straddle the post and the cutter-frame and provided at its free forked ends with notches 30; and studs or pins 31 on the cutter-frame, whereby the end portions of the bail are loosely and detachably connected to the cutter-frame and the latter may be easily withdrawn from operative relation to the hopper, substantially as described.

In witness whereof I have hereunto set my hand in the presence of two witnesses.

JOSEPH LEMIRE.

Witnesses:
T. MYNARD,
J. A. MARION.